United States Patent
Chauzu et al.

(10) Patent No.: US 10,660,270 B2
(45) Date of Patent: *May 26, 2020

(54) SHAKER DEVICE FOR A FRUIT HARVESTING UNIT

(71) Applicants: CNH Industrial America LLC, New Holland, PA (US); CQFD Composites, Wittenheim (FR)

(72) Inventors: Frank Chauzu, Rixheim (FR); Daniel H. A. M. Le Nevé, Challans (FR)

(73) Assignees: CNH Industrial America LLC, New Holland, PA (US); CQFD Composites, Wittenheim (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/778,585

(22) PCT Filed: Nov. 23, 2016

(86) PCT No.: PCT/EP2016/078604
§ 371 (c)(1),
(2) Date: May 23, 2018

(87) PCT Pub. No.: WO2017/089430
PCT Pub. Date: Jun. 1, 2017

(65) Prior Publication Data
US 2018/0343799 A1    Dec. 6, 2018

(30) Foreign Application Priority Data

Nov. 23, 2015    (FR) ...................................... 15 61244

(51) Int. Cl.
*A01D 46/28*    (2006.01)
*A01D 46/26*    (2006.01)
*A01D 46/06*    (2006.01)

(52) U.S. Cl.
CPC ............. *A01D 46/26* (2013.01); *A01D 46/28* (2013.01); *A01D 46/06* (2013.01); *A01D 2046/266* (2013.01)

(58) Field of Classification Search
CPC .. A01D 2046/266; A01D 46/26; A01D 46/28; A01D 46/06; A01D 45/00–30; A01D 46/00–30
See application file for complete search history.

(56) References Cited

U.S. PATENT DOCUMENTS 4,163,355 A * 8/1979 Edwards ................. A01D 46/24
56/328.1
4,207,727 A * 6/1980 Poytress ................. A01D 46/26
56/330

(Continued)

FOREIGN PATENT DOCUMENTS

| FR | 2359572 A1 | 2/1978 |
| FR | 2605487 A1 | 4/1988 |
| FR | 2789262 A1 | 8/2000 |

*Primary Examiner* — Alicia Torres
*Assistant Examiner* — Adam J Behrens
(74) *Attorney, Agent, or Firm* — Peter Zacharias; Patrick Sheldrake

(57) ABSTRACT

A shaker device including at least one motorized member that is intended to transmit by contact a shaking force to objects to be shaken. The member includes a plurality of structural inserts that are covered by a wear jacket. Each of the structural inserts has respective left lobes and right lobes. The inserts are distributed in the jacket so as to form a respective discrete stack of left lobes and right lobes.

18 Claims, 2 Drawing Sheets

(56) References Cited

U.S. PATENT DOCUMENTS

| | | | |
|---|---|---|---|
| 4,771,594 A * | 9/1988 | Deux | A01D 46/28 56/328.1 |
| 5,904,034 A * | 5/1999 | Youman | A01D 46/00 56/328.1 |
| 6,502,380 B1 * | 1/2003 | Merant | A01D 46/28 56/330 |
| 2004/0050030 A1 * | 3/2004 | Merant | A01D 46/28 56/340.1 |

* cited by examiner

SHAKER DEVICE FOR A FRUIT HARVESTING UNIT

TECHNICAL FIELD

The invention concerns a shaker device, a fruit harvesting unit including a shaker system comprising two such shaker devices, and a fruit harvesting machine comprising a support structure on which are mounted a harvesting unit of this kind and a system for recovering the detached harvest.

The invention applies in particular to the mechanised harvesting of fruit growing on trees or bushes planted in rows, such as grapes, berries, coffee beans, olives and other fruits, in particular fruits growing in bunches.

BACKGROUND ART

In the conventional way, the fruits are harvested by straddling at least one row of plants with a harvesting unit mounted on the support structure of a harvesting machine that is moved along said row. To this end, the harvesting unit comprises a straddling chassis delimiting a harvesting tunnel into which the plants are introduced successively to move in said tunnel between a front opening and a rear opening of said tunnel.

To detach the harvest from the plants, the harvesting unit includes a shaker system comprising two shaker devices, said shaker devices being disposed on respective sides of the harvesting tunnel to delimit said tunnel transversely.

Moreover, the harvesting machine comprises a recovery system that makes it possible to convey the flow of harvest obtained in order to be able, possibly after cleaning and/or sorting it, to store it in at least one hopper provided for this purpose or in an attached trailer.

Each shaker device comprises at least one motorised member and advantageously a plurality of shaker members that are spaced vertically from one another, said members being intended to transmit by contact a shaking force to a plant introduced into the harvesting tunnel.

In the known manner, the shaker members have active parts that extend substantially horizontally in the longitudinal direction of the harvesting unit and are adapted to effect a sinusoidal to and fro movement in a horizontal and transverse direction perpendicular to the longitudinal direction of said unit in order for their active part to come periodically into contact with the plant.

In particular, as described in the document FR-2 605 487, each shaker member may comprise a rod that may have a small section compared to its length and be manufactured from a flexible material, for example one based on a polyester resin charged with glass fibres or based on a polyamide.

However, the use of such rods gives rise to a certain number of problems. In particular, when the shaker system is operating, in addition to the horizontal movements used to shake the plant, these rods effect parasitic movements, in particular in the vertical direction.

Now, these parasitic movements can cause detachment of leaves and/or branches from the plant which, in addition to causing damage harmful to the health of said plant, introduces into the flow of harvest waste that complicates subsequent cleaning of such harvest. Moreover, these parasitic movements increase the risk of collision between two consecutive members of a shaker device, which further reduces the efficacy of said members and increases the risk of breaking them.

Moreover, because of the repetitive impacts against the plants and/or possible individual impacts against the wood or concrete stakes that support said plants, the rods may become worn, notably at the level of their active part, which eventually leads to a reduction in their section and therefore to an increase in their flexibility.

Now, an increase in the flexibility of a rod reduces its efficacy in that, with a rod that is too flexible, it is more difficult to cause a plant to oscillate. Moreover, the more flexible a rod, the greater the risk of parasitic movements occurring. Because of this, it is necessary to replace the shaker rods after a certain time of use, which leads to disadvantages in terms of cost if said time of use is too short.

To alleviate these disadvantages there are known from the document FR-2 789 262 shaker members that feature a structure with at least one insert adapted to have the oscillatory characteristics required for said member, said insert being moreover covered by a jacket formed of a wear material different from the material from which said insert is made.

In particular, the wear jacket is made from a material and/or with dimensions, in particular in terms of thickness, that are chosen to make it possible for the oscillatory characteristics of the insert plus jacket combination, in other words the complete shaker member, to be virtually those of the insert alone. Wear of the jacket therefore has a minimum or even substantially no influence on the oscillatory characteristics and therefore on the efficacy of the shaker member, which makes it possible to increase its service life, which is advantageous.

However, this solution is not entirely satisfactory, in that the distribution of the insert in the jacket and/or the choice of the material for said insert do not make it possible to limit effectively the parasitic oscillations of the rods during use under difficult speed and/or climate conditions. In particular, these rods tends to resonate when the oscillation frequency is high, for example greater than 480 cycles per minute, and/or when the ambient temperature and/or relative humidity are high, which proves particularly disadvantageous for harvesting grapes.

The invention aims to improve on the prior art by proposing a shaker device the members of which are, thanks to a an optimum distribution of the structural inserts in the wear jacket, adapted to have increased efficacy, notably at high oscillation frequencies, and over a wide range of wear.

SUMMARY OF THE INVENTION

To this end, according to a first aspect, the invention proposes a shaker device comprising at least one motorised member that is intended to transmit by contact a shaking force to objects to be shaken, said member including a plurality of structural inserts that are covered by a wear jacket, each of said structural inserts having respective left lobes and right lobes, said inserts being distributed in the jacket so as to form a respective discrete stack of left lobes and right lobes.

According to a second aspect, the invention proposes a fruit harvesting unit intended to be mounted on a harvesting machine, said unit comprising a straddling chassis delimiting a harvesting tunnel into which the plants to be shaken are intended to be introduced successively to move in said tunnel between a front opening and a rear opening of said tunnel, said harvesting unit featuring a shaker system comprising two such shaker devices that are disposed on respective sides of the harvesting tunnel to delimit said tunnel transversely.

According to a third aspect, the invention proposes a fruit harvesting machine comprising a support structure on which are mounted a harvesting unit of the above kind and a system for recovering the detached harvest.

DESCRIPTION OF THE FIGURES

Other objects and advantages of the invention will become apparent in the following description, given with reference to the appended figures, in which.

DETAILED DESCRIPTION OF EMBODIMENTS OF THE INVENTION

Figure 1:
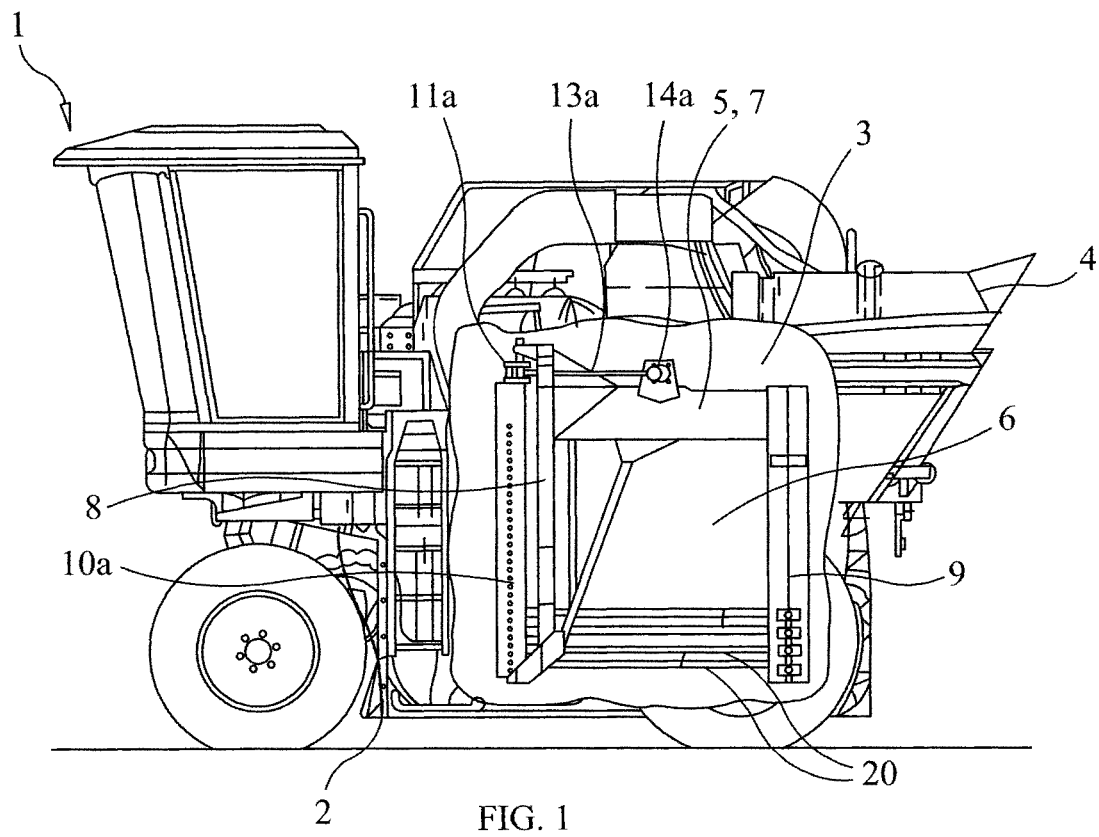
FIG. 1 represents diagrammatically and in side view a harvesting machine according to the invention, said side view being partly in section to show the harvesting unit.

In the context of the present description, terms for positions in space relative to the harvesting machine are defined relative to the direction of movement of said machine. In particular, in relation to FIG. 2, the terms "front" and the "rear" are represented respectively on the left and on the right in this Figure, "left" and the "right" are respectively represented at the bottom and at the top of this Figure, "transverse" means between the "left" and the "right, and "longitudinal" means between the "front" and the "rear".

The invention concerns a fruit harvesting machine 1 intended in particular for the mechanised harvesting of fruit growing on trees or bushes planted in rows, such as grapes, berries, coffee beans, olives or other fruits, in particular fruits growing in bunches. The harvesting machine 1 is more particularly intended for harvesting grapes and/or olives.

The harvesting machine 1 comprises a support structure 2, in particular a motorised structure, on which a harvesting unit 3 can be mounted either permanently or removably so that it can be replaced by other equipment and accessories, for example spraying equipment, plant pruning equipment or equipment for working the soil.

The harvesting machine 1 also comprises a system for recovering the harvest detached by the harvesting unit 3, said system being mounted on the support structure 2 of said harvesting machine. In one embodiment, the recovery system comprises two bucket conveyors adapted to recover the detached harvest under the harvesting unit 3 and to convey said harvest into the upper part of the harvesting machine 1 for storage in at least one hopper 4 provided for this purpose or in an attached trailer.

Further, the harvesting machine 1 may comprise a system for cleaning and/or sorting the flow of harvest from the bucket conveyor so as to eliminate components other than fruit, in particular leaves, stalks and wood chips.

The harvesting unit 3 comprises a straddling chassis 5 that can be mounted on the support structure 2 in a fixed manner or so that it can pivot about a horizontal and longitudinal axis, said straddling chassis delimiting a harvesting tunnel 6 into which the plants to be shaken are introduced successively to move in said tunnel between a front opening 6a and a rear opening 6b of said tunnel.

In FIG. 1, the straddling chassis 5 comprises a welded assembly that notably features an upper structure 7, left and right front pillars 8 and left and right rear pillars 9.

The harvesting unit 3 features a shaker system comprising two shaker devices disposed on respective sides of the harvesting tunnel 6 to delimit transversely a central part of said tunnel. In particular, the shaker system may be configured according to the document FR-2-605 487.

The left and right shaker devices include a left vertical shaft 10a and a right vertical shaft 10b, respectively, which is rotatably mounted, for example by means of two bearings, to the front of the upper structure 7 and to the lower end of the respective left and right front pillars 8.

Moreover, the shaker system comprises a mechanism for driving the left and right shaker devices. The driving mechanism comprises a left radial arm 11a and a right radial arm 11b fixed to the upper end of the left vertical shaft 10a and the right vertical shaft 10b, respectively. Alternatively, the radial arms 11a, 11b may be fixed to the lower ends of the vertical shafts 10a, 10b, respectively.

The radial arms 11a, 11b are articulated by a left vertical shaft 12a and a right vertical shaft 12b, respectively, to one of the ends of a left link 13a and a right link 13b, the other end of which is articulated to a crank pin of a left eccentric 14a and a right eccentric 14b, respectively, each of said eccentrics being fixed to a respective end of a transverse rod 15 rotatably mounted by means of two bearings carried by the upper structure 7 of the straddling chassis 5. The length of the links 13a, 13b is advantageously adjustable.

The drive mechanism further comprises a pulley or a chain wheel 16 that is fixed to the transverse rod 15 and connected by a transmission belt or an endless chain 17 to a second pulley or to a chain wheel 18 that is driven in rotation by a motor 19, for example a hydraulic motor. Accordingly, when the motor turns, the drive mechanism activates each shaker device of the shaker system by causing each vertical shaft 10a, 10b to oscillate about its axis.

Moreover, each shaker device of the main shaker system comprises a plurality of shaker members 20 that extend longitudinally and are spaced vertically from one another, the members 20 of each of said devices being spaced transversely to delimit between them the harvesting tunnel 6.

Figure 2:
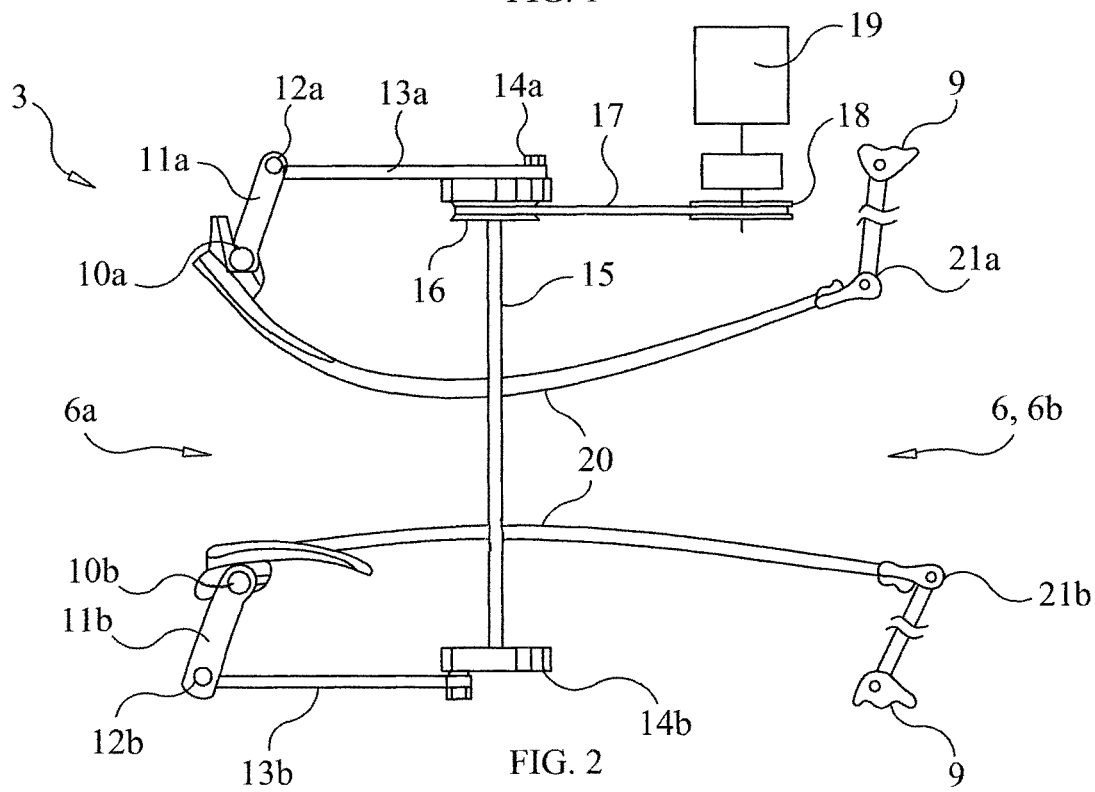
FIG. 2 represents diagrammatically the operating principle of the shaker system, of which two shaker members of respective shaker devices are represented as seen from above.

Referring to FIG. 2, the members 20 are curved and held between two front vertical shafts 10a, 10b and two rear vertical shafts 21a, 21b that are mounted to rotate relative to a respective rear pillar 9 of the straddling chassis 5. Moreover, the front end of each shaker member 20 is mounted on, for example screwed to, a vertical shaft 10a, 10b so that said member is driven in oscillation by said shaft.

In order to optimise the operational shaking height of the harvesting unit 3, the shaker system may comprise members 20 that extend vertically over substantially all the height of the shaking tunnel 6. In particular, each shaker device may comprise up to approximately twenty shaker members 20, the shaker members 20 of the left shaker device being offset vertically relative to the shaker members 20 of the right shaker device.

Moreover, the members 20 of the shaker system are curved and held between the front vertical shafts 10a, 10b and the rear vertical shafts 21a, 21b, respectively, to form between them a convergent front opening 6a and a divergent rear opening 6b of the shaking tunnel 6.

In the figures, each shaker member 20 has an elongate geometry, notably taking the form of a rod that has a small section compared to its length. In particular, for harvesting grapes, the members 20 have a diameter of the order of 30 mm, and more particularly of 30 mm, and a length of the order of 1.8 m.

In operation, the interior faces of the members 20, that is to say the faces directed toward the interior of the shaking tunnel 6, are in contact with the plants successively introduced into said tunnel in order to transmit to said plants a shaking force operable to cause the fruits to drop off.

However, this repetitive contact, notably during a plurality of successive cycles of the harvesting unit 3, can lead to wear of the interior face of the members 20. Moreover, the interior faces of the members 20 can come into localised contact with the wood or concrete stakes that support the plants, which can further aggravate the wear thereof.

Accordingly, in use, the section of the members 20 gets thinner, which increases their transverse flexibility and therefore progressively reduces their shaking efficacy. Moreover, this transverse thinning of the members 20 increases the risk of parasitic movements occurring, in particular in the vertical direction, which also compromises the efficacy of said members.

To alleviate these disadvantages, each shaker member 20 comprises at least one structural insert 22, 24 that has the oscillatory characteristics required for said member, said insert being covered by a distinct wear jacket 23 that is made of a material that may be different from that from which said insert is made.

The wear of the jacket 23 therefore has a minimal influence, or even substantially no influence, on the oscillatory characteristics of the shaker member 20 and therefore on the efficacy of said member, which makes it possible to increase its service life, which is advantageous.

To strengthen the cohesion of the insert 22, 24 and the jacket 23, said insert comprises a reinforcement included in a matrix that is covered by the jacket 23, said matrix being based on a material which is different from that of the jacket 23 in that it is adapted to adhere to the reinforcement and to the material of the jacket 23.

A judicious choice of the material of the matrix therefore improves the cohesion of the assembly and therefore the overall stiffness of the member 20. This effectively limits the risks of parasitic movements occurring, notably in the case of high oscillation frequencies and/or conditions of high temperature and/or relative humidity.

In particular, in order to facilitate the cohesion of the insert 22, 24 to said jacket 23 the material of the matrix is of the same chemical nature as the material of the jacket 23. The two materials are advantageously based on a thermoplastic material, in particular polyamide. For example, the material of the jacket 23 may be chosen from the polyamide 11 family and the material of the matrix may be chosen from the polyamide 6 family, in particular polyamide 6.6.

The insert 22, 24 comprises at least one bundle of reinforcing fibres that is covered by the matrix material. In particular, the fibres may be based on glass and/or carbon.

Figure 3:
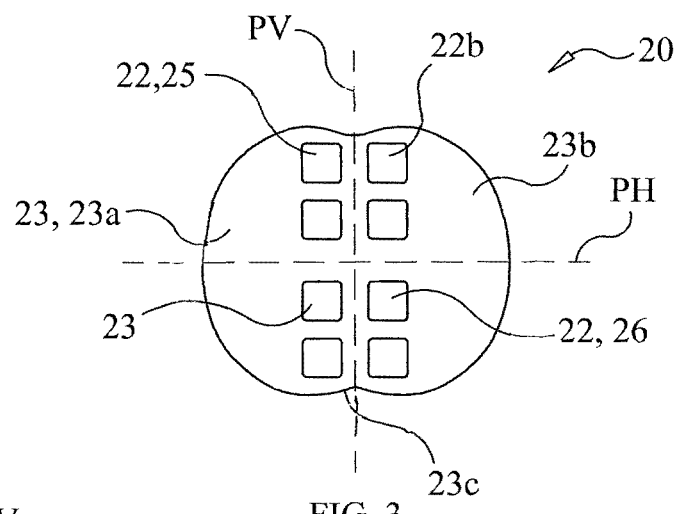
FIG. 3 represents diagrammatically in cross-section a shaker member according to one embodiment of the invention.
Figure 4:
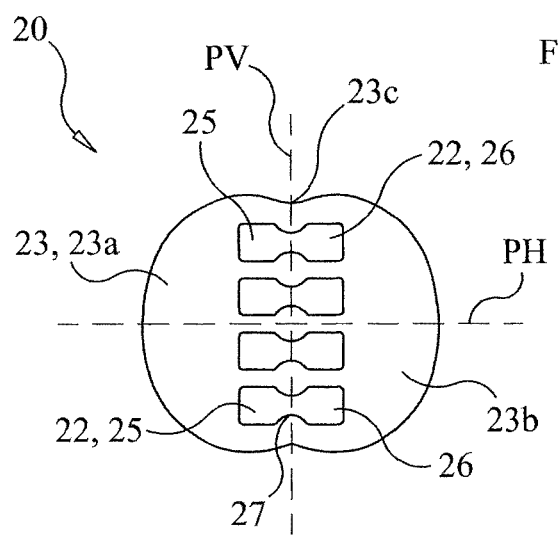
FIGS. 4 and 5 represent diagrammatically in cross-section a shaker member according to two respective other embodiments of the invention.
Figure 5:
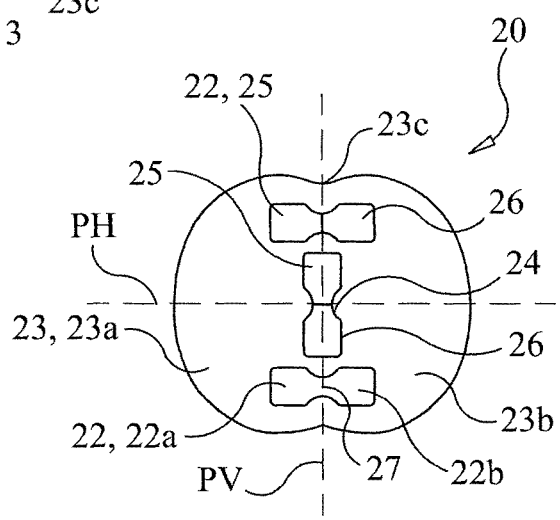

Referring to FIGS. 3 to 5, each member 20 features a plurality of structural inserts 22, each of which has a left lobe 25 and a right lobe 26 and which are distributed in the jacket 23 so as to form a discrete vertical stack of left lobes 25—respectively right lobes 26. In particular, these inserts 22, 24 have the same matrix and each of them includes reinforcements.

In FIG. 5, the member 20 comprises upper and lower inserts 22, the respective left lobes 25 and right lobes 26 of which are vertically aligned two by two as well as an intermediate insert 24 of identical structure to said upper and lower inserts except that the lobes 25, 26 thereof are aligned vertically two by two.

This way of distributing the inserts 22 in the jacket 23 makes it possible to improve the cohesion of the assembly and therefore to improve the overall stiffness of the member 20. When using the shaker system, the forces induced by the oscillations of the member 20 are therefore better distributed over said member, which makes it possible to limit effectively the risks of parasitic movements occurring, notably in the case of high oscillation frequencies and/or conditions of high temperature and/or relative humidity.

The inserts 22, 24 are advantageously adapted to form a stack with a vertical dimension greater than its horizontal transverse dimension, which makes it possible to increase the vertical stiffness of the member 20 and therefore to limit the risks of vertical parasitic movements during oscillations of said member.

Moreover, the jacket 23 is configured to have a cross-section with a horizontal dimension greater than its vertical dimension, which makes it possible not only to confer on the member 20a substantially circular cross-section, and thus to compensate for the increase in the vertical dimension of the stack of inserts 22, 24, but also to strengthen the protection of the insert 22, 24 on the lateral faces of the member 20, and more particularly at the level of the interior face intended to come into contact with the plants to be shaken.

In the embodiments represented, the jacket 23 has an exterior geometry comprising a left lateral bead 23a and a right lateral bead 23b in which are embedded the left lobe 25 and the right lobe 26, respectively.

In particular, the beads 23a, 23b are symmetrical with respect to two median longitudinal planes of the jacket 23, in particular a horizontal plane PH and a vertical plane PV, and are connected by a central part 23c through which the vertical plane PV passes, said central part having a vertical outside dimension less than the vertical outside dimension of said beads.

In the figures, the lobes 25, 26 of the same insert 22 are symmetrically positioned with respect to the plane PV. Moreover, the left lobe 25 and the right lobe 26 are symmetrically positioned relative to the plane PH. This kind of symmetrical distribution of the inserts 22 in the jacket 23 makes it possible to confer identical stiffnesses on the left and right parts of the member 20 and therefore to ensure a balanced distribution of the forces exerted on the member 20 when said member oscillates.

The left-hand lobe 25 and the right-hand lobe 26 of the inserts 22 are advantageously aligned in the vertical direction, which makes it possible to confer on the member 20 an increased stiffness in said vertical direction, both on its left part and on its right part. Moreover, each of the inserts 22, 24 extends inside the jacket 23 in the longitudinal direction of the member 20, in particular over a length substantially equal to the total length of said member, in order to confer on said member good horizontal stiffness over all its length.

In the embodiments represented, the lobes 25 feature a cross-section of substantially square shape, in particular square with rounded corners, which makes it possible to increase the areas of contact with the material constituting the wear jacket 23 and therefore to strengthen the cohesion of the assembly. In particular, the corners may have a radius of curvature of the order of 0.8 mm.

The inserts 22 are generally separated vertically two by two by a gap of small vertical dimension, in particular of the order of 2 mm, but sufficient to allow the material constituting the wear jacket 23 to fill said gap during the fabrication of the member 20.

In FIG. 3, the left-hand lobe 25 and the right-hand lobe 22 of the same insert 22 are separate and separated by a gap the horizontal dimension of which is small but sufficient to allow the material constituting the wear jacket 23 to fill said gap during the fabrication of the member 20.

In FIGS. 4 and 5, the lobes 25, 26 of the same insert 22, 24 are connected in the transverse horizontal direction (inserts 22) or in the vertical direction (intermediate insert 24) by a bridge 27 defining the relative positioning of said lobes in the jacket 23.

In particular, the lobes 25, 26 may feature an outside dimension that is greater than the outside dimension of the bridges 27. The lobes 25, 26 advantageously have a vertical dimension Dv of the order of 4 mm and the bridge 27 advantageously has a vertical dimension Dv of the order of 2 mm. Further, the lobes 25, 26 have a horizontal transverse dimension Dh substantially equal to their vertical dimension Dv, and therefore of the order of 4 mm, the total horizontal dimension DT of the insert 22, 24 being of the order of 11 mm.

Figure 6:
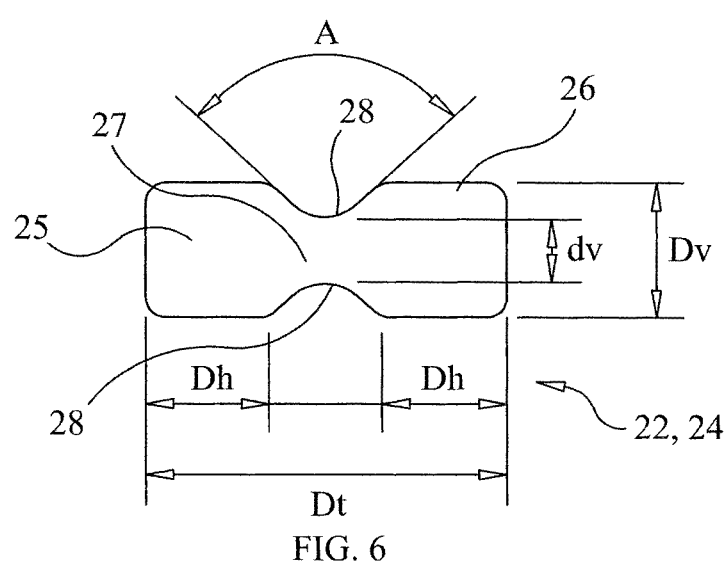
FIG. 6 is a view to a larger scale of a structural insert from FIGS. 4 and 5.

Referring to FIG. 6, each insert 22, 24 has an upper face and a lower face on each of which a central groove 28 is formed to delimit the bridge 27 between said grooves. In particular, the grooves 28 have a central radius of curvature of the order of 1.5 mm and form in the transverse plane an angle A of the order of 97°.

The invention claimed is:

1. A shaker device comprising:
at least one motorized member configured to transmit by contact a shaking force to objects to be shaken, the at least one motorized member comprising a plurality of structural inserts that are covered by a wear jacket, each of the plurality of structural inserts comprising two lobes, respectively a left lobe and a right lobe, the plurality of structural inserts being distributed in the wear jacket so as to form a respective discrete stack of left lobes and right lobes.

2. The shaker device according to claim 1, wherein the left lobes and the right lobes are aligned in a vertical direction.

3. The shaker device according to claim 1, wherein the lobes of each of the plurality of inserts are connected in a horizontal direction by a bridge defining relative positions of the lobes in the jacket.

4. The shaker device according to claim 3, wherein the lobes have an outside dimension that is greater than an outside dimension of the bridges.

5. The shaker device according to claim 1, wherein the lobes are symmetrically positioned relative to at least one vertical plane of symmetry of the at least one motorized member.

6. The shaker device according to claim 5, wherein each of the lobes has a section of square geometry.

7. The shaker device according to claim 1, wherein the jacket has an outside geometry comprising a left lateral bead and a right lateral bead that cover the left lobe and the right lobe, respectively, the beads being connected by a central part.

8. The shaker device according to claim 7, wherein an outside dimension of the central part is less than an outside dimension of the beads.

9. The shaker device according to claim 1, wherein the least one motorized member has an elongate geometry along which the structural inserts extend in the jacket.

10. The shaker device according to claim 9, wherein each structural insert has an upper face and a lower face on each of which is formed a central groove to delimit a bridge between the grooves.

11. The shaker device according to claim 1, wherein the plurality of structural inserts comprise at least one bundle of fibers.

12. The shaker device according to claim 1, wherein the plurality of structural inserts comprise a reinforcement included in a matrix that is covered by the jacket.

13. The shaker device according to claim 12, wherein the plurality of structural inserts have a same matrix including the reinforcement.

14. The shaker device according to claim 12, wherein the matrix is based on a material that is different from that of the jacket in that the material of the matrix is adapted to adhere to the reinforcement and to the material of the jacket.

15. The shaker device according to claim 1, wherein the at least one motorized member comprises a plurality of shaker members which are spaced vertically from one another.

16. The shaker device according to claim 1, wherein at least one end of the at least one motorized member is mounted on a motorized shaft that is adapted to induce oscillation of the at least one motorized member.

17. The shaker device according to claim 16, wherein the at least one motorized member is curved and held between two vertical shafts.

18. A fruit harvesting unit for being mounted on a harvesting machine, the unit comprising:
a straddling chassis delimiting a harvesting tunnel into which plants to be shaken are intended to be introduced successively to move in the tunnel between a front opening and a rear opening of the tunnel; and
a shaker system comprising two shaker devices, each comprising:
at least one motorized member configured to transmit by contact a shaking force to objects to be shaken, the at least one motorized member comprising a plurality of structural inserts that are covered by a wear jacket, each of the plurality of structural inserts comprising two lobes, respectively a left lobe and a right lobe, the plurality of structural inserts being distributed in the wear jacket so as to form a respective discrete stack of left lobes and right lobes,
wherein each of the two shaker devices is disposed on a respective side of the harvesting tunnel to delimit the tunnel transversely.

* * * * *